United States Patent [19]
Usami et al.

[11] Patent Number: 5,761,902
[45] Date of Patent: Jun. 9, 1998

[54] CHANGE-OVER VALVE UNIT FOR SWITCHING EXHAUST GAS PASSAGES AND EXHAUST GAS PURIFYING SYSTEM

[75] Inventors: Hiroyuki Usami, Kariya; Masakazu Tanaka, Okazaki; Hiroshi Mori, Ichinomiya; Mamoru Mabuchi, Kariya; Kinji Hodaira, Okazaki; Tatsuo Sakai, Kariya, all of Japan

[73] Assignee: Nippondenso Co., Ltd., Kariya, Japan

[21] Appl. No.: 507,949

[22] Filed: Jul. 27, 1995

[30] Foreign Application Priority Data

Jul. 28, 1994 [JP] Japan .................................. 6-176902
Apr. 11, 1995 [JP] Japan .................................. 7-085766

[51] Int. Cl.$^6$ .......................................... F01N 3/28
[52] U.S. Cl. .......................... 60/288; 60/297; 137/625.44; 137/875
[58] Field of Search .................. 60/288, 297; 137/625.44, 137/872, 875

[56] References Cited

U.S. PATENT DOCUMENTS

| | | | |
|---|---|---|---|
| 260,490 | 7/1882 | Martin | 137/875 |
| 1,424,776 | 8/1922 | Scheid | 137/625.44 |
| 1,585,951 | 5/1926 | Waller | 137/875 |
| 5,264,186 | 11/1993 | Harada et al. | |
| 5,299,601 | 4/1994 | Koch | 137/875 |
| 5,349,816 | 9/1994 | Sanbayashi | 60/288 |

FOREIGN PATENT DOCUMENTS

| | | |
|---|---|---|
| 0588315 | 3/1994 | European Pat. Off. |
| 2135126 | 5/1990 | Japan |
| 4-17710 | 1/1992 | Japan |
| 4-60108 | 2/1992 | Japan |
| 4311618 | 11/1992 | Japan |
| 6-74020 | 3/1994 | Japan |

*Primary Examiner*—Douglas Hart
*Attorney, Agent, or Firm*—Cushman Darby & Cushman IP Group of Pillsbury Madison & Sutro LLP

[57] ABSTRACT

A change-over valve unit has a change-over valve for switching a bypass passage and an exhausting passage disposed in parallel therewith. An adsorbent is disposed in the bypass passage to adsorb exhaust components. An actuator of the change-over valve is isolated from an adsorption cylinder by a pedestal. Furthermore, rotary shafts of the control mechanism of the change-over valve are positioned within the bypass passage of the adsorber when the change-over valve is positioned to open the main exhaust passage. Thus, the heat of the exhaust gas flowing through the main exhaust passage is not transmitted to the rotary shafts.

22 Claims, 10 Drawing Sheets

X: WELDED PORTION

CHANGE-OVER VALVE UNIT FOR SWITCHING EXHAUST GAS PASSAGES AND EXHAUST GAS PURIFYING SYSTEM

CROSS REFERENCE TO RELATED APPLICATIONS

This application is based upon and claims priority from Japanese Patent Application No. Hei 6-176902 filed Jul. 28, 1994 and Japanese Patent Application No. Hei 7-85766 filed Apr. 11, 1995, with the contents of each document being incorporated herein by reference.

BACKGROUND OF THE INVENTION

1. Field of the Invention

The present invention relates to a change-over valve unit for switching exhaust gas passages and an exhaust gas purifier of an engine (internal combustion engine) mounted in an automobile and the like.

2. Description of the Related Art

As one type of purifiers for purifying exhaust gas of an automobile engine, there has been known an exhaust gas purifier using a carrier carrying a noble metal such as platinum and rhodium as a catalyst. Generally, this type of purifier requires more than 350° C. of catalyst activating temperature to purify hydrocarbon compounds (hereinafter abbreviated as HC).

Accordingly, it has a problem that almost no HC is purified at the time when the engine has been just started because the temperature of the catalyst does not reach to the above-mentioned catalyst activating temperature.

Then, in order to solve the aforementioned problem, purifiers in which a catalyzer is disposed in an engine exhaust gas system and a HC trapper in which adsorbent for adsorbing HC exhausted when the engine is cold (hereinafter referred to as cold HC) is disposed at the upstream or downstream side of the catalyzer have been proposed in Japanese Patent Applications Laid-open Nos. Hei. 2-135126, Hei. 4-17710, Hei. 4-311618 and others.

In the purifier disclosed in Japanese Patent Application Laid-open No. 2-135126, an adsorber using zeolite adsorbent is disposed on the upstream side of the catalyzer and using the adsorber and catalyzer together, cold HC is adsorbed by the adsorbent when an exhaust gas temperature is low and HC desorbed from the adsorbent and HC exhausted from the engine are purified by the catalyst when the exhaust gas temperature is high.

In the purifiers disclosed in Japanese Patent Application Laid-open Nos. Hei. 4-17710 and Hei. 4-311618, an HC trapper containing adsorbent is disposed in parallel with a main exhaust pipe on the downstream side of a catalyzer and passage change-over valves are provided respectively in a bypass passage containing the HC trapper and in the main exhaust pipe (main exhaust passage).

The above-mentioned valves are controlled during a predetermined period of time after when an engine has been just started to flow exhaust gas through the bypass passage to adsorb cold HC by the trapper. When the predetermined time has elapsed since the start of the engine, the exhaust gas temperature has risen and the cold HC starts to be desorbed from the adsorbent of the HC trapper, the above-mentioned valves are switched to positions of flowing exhaust gas through the main exhaust pipe (main exhaust passage). At this time, a negative pressure of an intake pipe of the engine is applied to a desorption pipe connecting the downstream side of the trapper and the engine intake pipe and the desorbed HC is sucked into the intake pipe to be burned again in the engine.

However, among the prior art HC adsorption technologies described above, a heat resistance of the absorbent becomes a problem in the one in which the HC trapper is disposed on the upstream side of the catalyzer because high temperature exhaust gas just emitted from the engine flows into the HC trapper. Then, heat resistant zeolite absorbent is used in Japanese Patent Application Laid-open No. Hei. 2-135126. However, because the adsorbent generally has a higher adsorption performance when its temperature is low and HC is desorbed before the catalyst reaches to its activating temperature even with zeolite, there has been a problem that HC expressly desorbed is emitted to the atmosphere without being purified.

There has been also another problem that if the HC trapper is disposed on the upstream side of the catalyzer, it delays the activation of the catalyst, i.e. the time necessary for the catalyst to reach the activating temperature, because it becomes a large thermal capacity by itself.

The above-mentioned problems are solved in terms of the cold HC adsorption performance and the activation of catalyst by the units disclosed in Japanese Patent Application Laid-open Nos. Hei. 4-17710 and Hei. 4-311618, in which the HC trapper is disposed on the downstream side of the catalyzer. However, those units have a problem that they lack in reliability in using for a long period of time because no special measure is taken to counter intense heat for the passage change-over valves provided respectively at the bypass passage containing the HC trapper and the main exhaust passage even though they are installed in such a severe environment (high temperature, high humidity and high corrosive atmosphere) of exhaust gas and because deformation and distortion are apt to be generated and an inoperability such as a pinch is apt to be generated in the change-over valves, rotary shafts for controlling the valves and the like which are constantly exposed to high temperature exhaust gas.

Japanese Patent Application Laid-open No. Hei. 4-60108 has proposed an exhaust gas purifier in which an exhaust pipe right under an engine is ramified to provide an exhaust gas main passage and a bypass passage disposed in parallel with the main passage, an electric heated catalyzer (EHC) which is a heater-fitted catalyzer and carries catalyst is disposed in the bypass passage and a main catalyzer is disposed at a region where the main passage and the bypass passage join again and become one exhaust pipe.

Exhaust gas is flown through the bypass passage only when a temperature of the exhaust gas is low and the exhaust gas is flown through the main passage when the temperature of the exhaust gas becomes high in the unit disclosed in that publication. The exhaust gas is purified when its temperature is low by the heater-fitted catalyzer disposed in the bypass passage. At this time, the main catalyzer is activated gradually by the heat of the exhaust gas and the heat of reaction and heater of the heater-fitted catalyzer and when the main catalyzer is activated, the exhaust passage is switched so as to flow the exhaust gas to the main exhaust passage.

Accordingly, in the above-mentioned unit, a change-over valve which is capable of selectively switching the exhaust gas passages is disposed at the ramification point of the main exhaust passage and the bypass passage. However, because no measure is taken concretely to improve the heat resistance of the change-over valve also in the above-mentioned unit, there has been a problem that it is apt to cause an inoperability such as a pinch and lacks in reliability in using for a long period of time similarly to the prior art technology described above.

SUMMARY OF THE INVENTION

It is an object of the present invention to solve the aforementioned problems by providing a change-over valve unit, for switching and opening/closing a bypass passage wherethrough exhaust gas flows when an engine is cool and a main exhaust passage wherethrough exhaust gas flows when the engine is warm, whose reliability in use in an exhaust gas atmosphere is improved.

In order to achieve the aforementioned object, as one preferred mode, the present invention adopts a change-over valve unit for switching a bypass passage through which exhaust gas flows when an engine is cool and a main exhaust pipe through which exhaust gas flows when the engine is warm, includes:

a change-over valve for switching the bypass passage and the main exhaust passage;

an actuator for driving the change-over valve; and a valve control mechanism disposed between the change-over valve and the actuator for transmitting an action of the actuator to the change-over valve, wherein the valve control mechanism is positioned within the bypass passage to prevent from obstructing the main exhaust passage when the change-over valve is switched to open the main exhaust passage.

In another preferred mode of the present invention, the valve control mechanism includes a rotary shaft turned by the action of the actuator; bearings for supporting the rotary shaft; and a connecting member of which one end is connected to the rotary shaft and the other end is connected to the change-over valve. The rotary shaft, bearings, connecting member are all disposed within the bypass passage when the change-over valve is switched to open the main exhaust passage.

According to the invention described, the unit is provided with a valve control mechanism for transmitting an action of an actuator to a passage change-over valve and the valve control mechanism is positioned within a bypass passage when the change-over valve is in a position of opening a main exhaust passage, so that the control mechanism part of the change-over valve and the rotary shafts are not exposed to high temperature exhaust gas flowing through the main exhaust passage. Due to that, a trouble such as an inoperability or deterioration of the rotary shafts which might be otherwise caused by intense heat may be effectively prevented from occurring.

Further, the actuator is provided in the bypass passage where only low temperature exhaust gas flows when the engine is cool and no exhaust gas flows when the engine is warm, so that it receives less thermal influence from the high temperature exhaust gas when the high temperature exhaust gas flows through the main exhaust passage when the engine becomes warm. Accordingly, a thermal deterioration of the actuator may be remarkably reduced.

The actuator is isolated from the exhaust pipe, so that it will receive no heat directly from the exhaust pipe and the peripheral portion of the actuator is cooled by the atmosphere, allowing to maintain a relatively low temperature state. Accordingly, the actuator hardly causes a failure or deterioration due to high temperature exhaust gas.

According to still another preferred mode of the invention, the bearing of the change-over valve is disposed on a member which is exposed to the outside air, so that the bearing is cooled by the outside air through the member even if the bearing receives heat and its deformation which might be otherwise caused by heat or inoperability which might be otherwise caused by a pinch may be suppressed. As a result, a thermal reliability of the bearing 83a is improved further.

According to a further preferred mode of the invention, a space is created not to contact the bearing with a member of the main exhaust passage, so that the bearing hardly receives heat transmitted from the high temperature exhaust gas flowing through the main exhaust passage and its deformation which might be otherwise caused by the heat or inoperability which might be otherwise caused by a pinch may be suppressed.

According to a still further preferred mode of the invention, the valve control mechanism for transmitting an action of the actuator to the change-over valve comprises the rotary shaft for turning the passage change-over valve and the rotary shaft is axially supported by the bearing only at its both ends, so that a leakage of the exhaust gas may be prevented by a micro-clearance control at the both ends and a pinch or lock of the rotary shaft which might be otherwise caused by a thermal deformation may be prevented from occurring by relieving the thermal deformation at the middle portion thereof.

Further, according to another preferred mode of the invention, the valve control mechanism comprises a first rotary shaft for turning the passage change-over valve, a connecting member whose one end is connected to the first rotary shaft, a second rotary shaft to which the other end of the connecting member is connected and bearings provided on the passage change-over valve for axially supporting the second rotary shaft, and an inner diameter of the bearings is made larger than an outer diameter of the second rotary shaft so that a gap C is created between the second rotary shaft, so that the passages may be reliably closed and switched even if the parts to which the change-over valve abuts inclines because the gap C between the bearing and the second rotary shaft can absorb such inclination or the like.

In addition to the described above, according to the invention exhaust gas is emitted from the catalyzer via the adsorber in the bypass passage by the passage switching action of the exhaust gas passage switching means when the engine has been just started and is cool. At this time, HC within the exhaust gas which has not been purified by the catalyzer is adsorbed by the adsorbent in the adsorber.

On the other hand, when the engine has been warmed up, exhaust gas is emitted from the catalyzer via the main exhaust passage where the adsorber is not present by the passage switching action of the exhaust gas passage switching means. At this time, HC within the exhaust gas becomes high temperature and is purified by the activated catalyzer.

The HC absorbed by the adsorbent of the adsorber is desorbed and the desorbed HC is returned from the reflux passages to the upstream side of the catalyzer and is quickly purified by the catalyzer.

According to the further preferred mode of the invention, exhaust gas is emitted via a quick activating catalyzer in the bypass passage by the passage switching action of the exhaust gas passage switching means when the engine has been just started and is cool. At this time, hazardous components such as HC within the exhaust gas which cannot be purified by the catalyzer may be purified by the heater-fitted catalyzer which is quickly activated in a short time after the start of the engine.

On the other hand, when the engine has been warmed up, exhaust gas is emitted to outside via the main exhaust passage and the catalyzer by the passage switching action of the exhaust gas passage switching means. At this time, the hazardous components such as HC within the exhaust gas become high temperature and are purified by the activated catalyzer.

The above and other advantages of the present invention will become more apparent in the following description and the accompanying drawings in which like numerals refer to like parts.

DETAILED DESCRIPTION OF PREFERRED EMBODIMENTS

Figure 1:
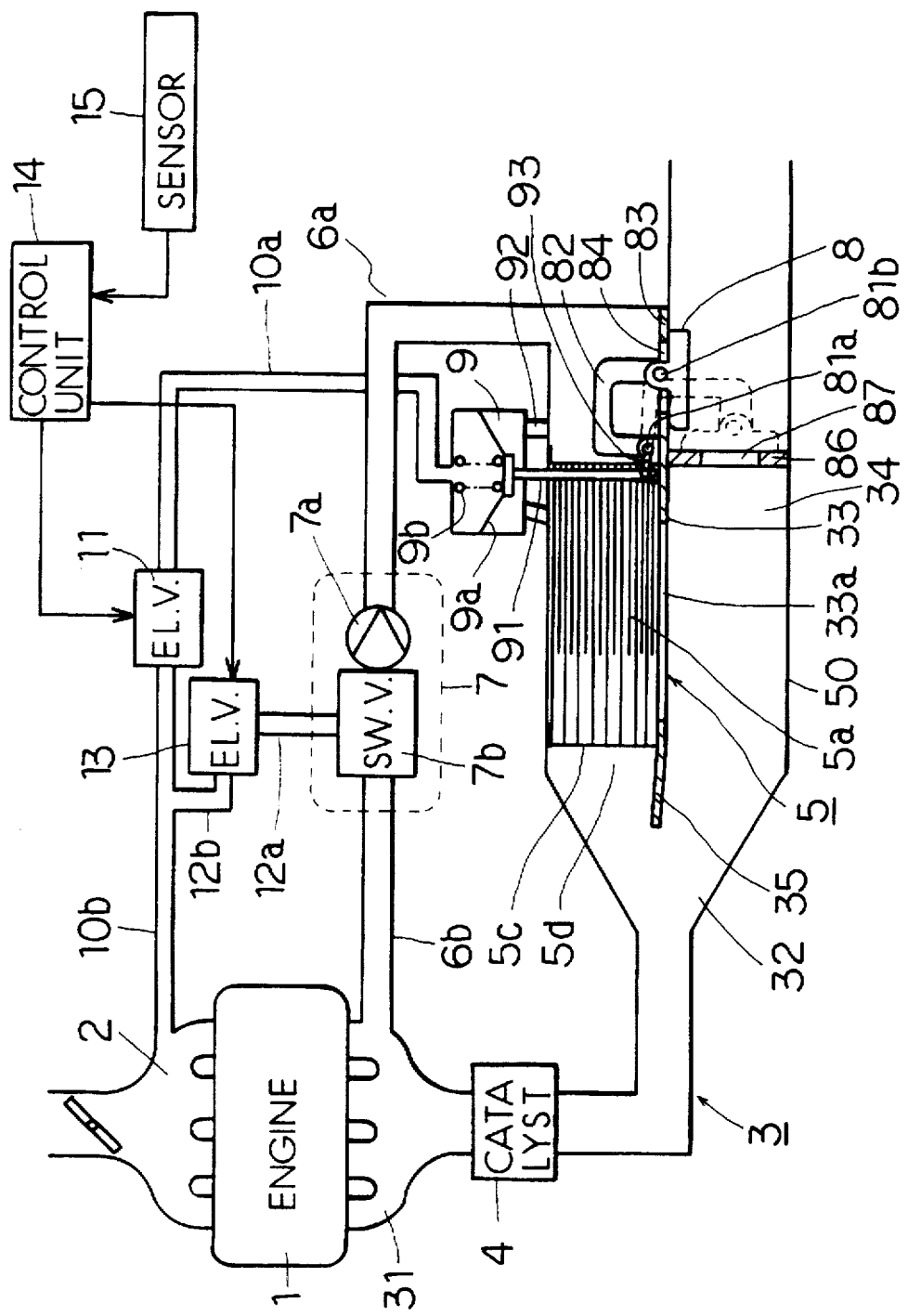
FIG. 1 is an overall structural diagram of a unit according to a first embodiment of the present invention.

The present invention will be explained below with reference to preferred embodiments shown in the drawings.

[First Embodiment]

FIG. 1 shows a first embodiment in which the present invention is applied to an exhaust gas purifier of an automobile engine. In the figure, a catalyzer 4 is interposed between exhaust pipes 3 of a gasoline engine 1 of the automobile at the position right after an exhaust manifold 31. The catalyzer 4 comprises a honeycomb carrier made from cordierite carrying tertiary catalyst mainly composed of a noble metal such as platinum and rhodium.

The exhaust pipe 3 has a large diameter section 32 on the downstream side of the catalyzer 4 to store an adsorber 5 having a honeycomb structure. The adsorber 5 is constructed so as to have the honeycomb structure by stainless steel or ceramics such as cordierite and is formed into a shape having a section of half of a cylindrical adsorption cylinder 50 constructed in succession to the large diameter section 32, i.e. into a semi-cylindrical shape which fits in the adsorption cylinder 50, as shown in FIG. 2.

Figure 2:
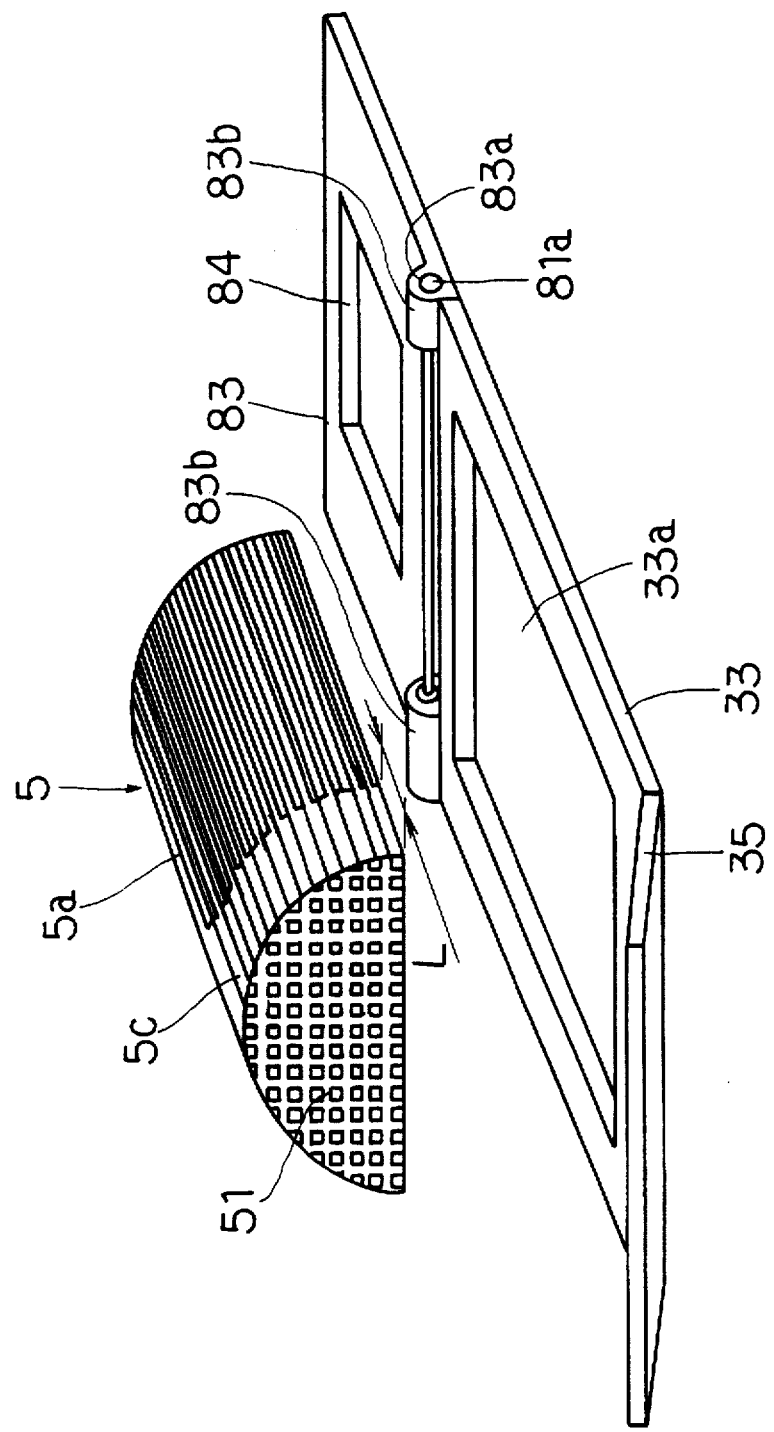
FIG. 2 is a perspective view of a honeycomb adsorber carrying adsorbent in a semicircular section part thereof and a partition used in the unit of the first embodiment of the present invention.

As shown in FIG. 2, the adsorber 5 has a large number of parallel through holes 51 and carries zeolite adsorbent at a layer 5a carrying the adsorbent formed across the whole part thereof except of the upstream end thereof. Note that the adsorber 5 may be formed not only into the semi-cylindrical shape, but also into an oval or square shape in correspondence with a shape of the adsorption cylinder 50.

A change-over valve 8 for switching exhaust gas passages is provided immediately after the downstream end (rear end) of the adsorbent-carrying layer 5a of the adsorber 5. The change-over valve 8 opens/closes pivoting on a fulcrum 81a and switches a bypass passage 5d in which the honeycomb structure adsorber 5 is provided and a main exhaust passage 34 formed side by side with the bypass passage 5d.

A distance between the catalyzer 4 and the adsorber 5 is set so that a timing when a temperature of the catalyzer 4 which is heated and activated by exhaust gas reaches to its activating temperature almost coincides with a timing when the absorbent carried by the adsorber 5 looses its absorbing function as it is heated. That is, because the temperature at which the absorbent carried on the adsorber 5 looses its absorbing function (it is, in other words, a HC desorption starting temperature of the absorbent which is 100° C. to 200° C.) is lower than the catalyst activating temperature (350° C.) of the catalyzer 4, the both timings may be set so as to coincide by providing the adsorber 5 on the downstream side of the catalyzer 4 by a certain distance.

The adsorber 5 has a plate-like partition 33 between the main exhaust passage 34. The adsorber 5 is separated from the main exhaust passage 34 and is held by being pressed against the adsorption cylinder 50 by the partition 33. The partition 33 is provided with an opening 33a which allows exhaust gas within the main exhaust passage 34 to contact directly with the adsorber 5. A rectifying plate 35 is disposed on the upstream side of the adsorber 5. It enhances an efficiency in adsorbing HC and others into the adsorbent by homogenizing a distribution of flow rates of exhaust gas when the exhaust gas flows through the bypass passage 5d where the adsorber 5 is provided. Note that the partition 33 and the rectifying plate 35 are made from a heat-resistant metal such as stainless steel and may be formed monolithically as shown in FIG. 2 or may be formed separately. In the example shown in FIG. 2, a partitioning plate 83 is also formed integrally with the partition 33 on the downstream side of the partition 33.

A reflux passage 6a ramifies at a position near the downstream end of the adsorber 5 in the bypass passage 5d and at a position upstream side of the change-over valve 8 and is linked to a reflux passage 6b which communicates with the exhaust manifold 31 via a reed valve 7. The reed valve 7 constitutes flow adjusting means for controlling flows in the passages 6a and 6b to flow only in one direction, i.e. one direction from the downstream end of the adsorber 5 toward the exhaust manifold 31, and comprises a one-way valve 7a and a switching valve 7b described later.

An actuator 9 for driving the change-over valve 8 is provided on the adsorption cylinder 50 which forms the bypass passage 5d through an intermediary of a pedestal 92. The pedestal 92 is made from a heat-resistant metal such as stainless steel (for example SUS 304 designated in Japanese Industrial Standard) and is used to mount the actuator 9 by separating from the adsorption cylinder 50 framing a part of the exhaust pipe 3 by a predetermined distance (e.g. about 35 mm). The actuator 9 is isolated thermally from the adsorption cylinder 50 by the pedestal 92.

The actuator 9 has a diaphragm 9a and a spring 9b in the present embodiment and communicates with an intake manifold 2 of the engine 1 through intake pipes 10a and 10b for supplying a negative pressure for operating the diaphragm 9a. An electromagnetic valve 11 is interposed between the intake pipes 10a and 10b.

A valve control mechanism described below is interposed between the exhaust gas passage change-over valve 8 and the actuator 9 described above. That is, the exhaust gas passage change-over valve 8 is connected to the diaphragm 9a of the actuator 9 via a shaft 91, a crank 93, a first rotary shaft 81a, an arm 82 and a second rotary shaft 81b.

Figure 3:
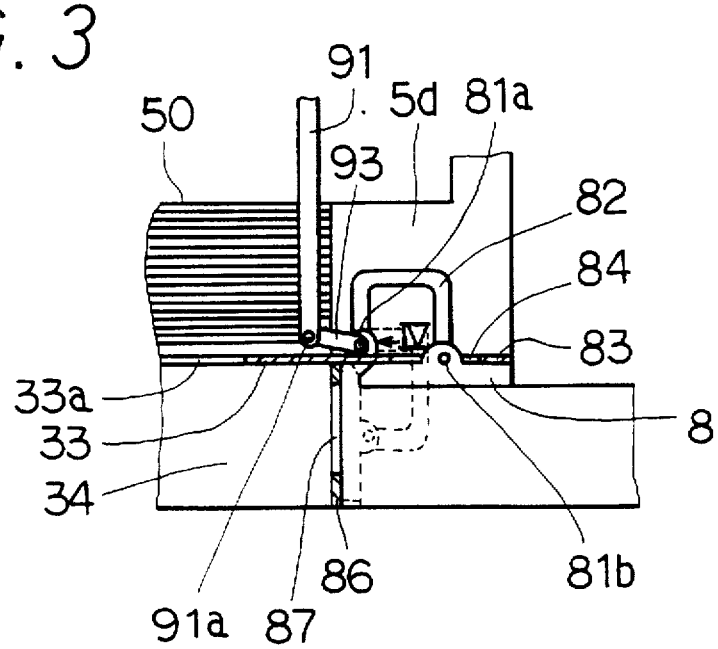
FIG. 3 is an enlarged section view showing a part of an exhaust gas passage change-over valve in the unit of the first embodiment.
Figure 4:
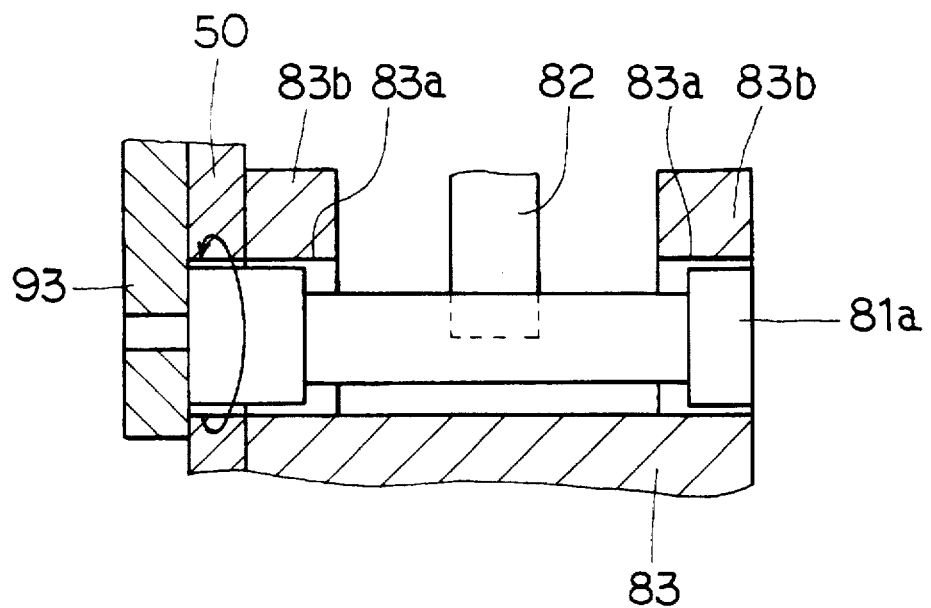
FIG. 4 is an enlarged section view of a main part of the unit of the first embodiment viewed from IV in FIG. 3.
Figure 5:
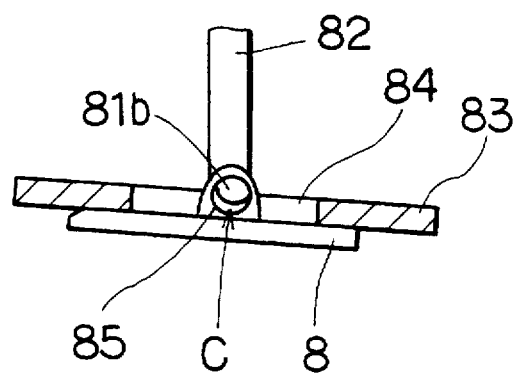
FIG. 5 is an enlarged section view of a main part of the unit of the first embodiment.

FIGS. 3 through 5 are enlarged views of the valve control mechanism part described above. In the figures, a lower end of the shaft 91 is pivotably connected to one end of the crank 93 by a pin 91a and the other end of the crank 93 is connected integrally with one end of the first rotary shaft 81a so as to turn in one body with the first rotary shaft 81a.

Two projecting pieces 83b which constitute bearings 83a for pivotably supporting the first rotary shaft 81a are formed on the partitioning plate 83. Note that the first rotary shaft 81a is formed as a shaft having different diameters in which the diameter is large at the both ends thereof and the diameter is small at the middle portion thereof and it is axially supported by the bearing 83a only by its large diameter portions at the both ends thereof.

Then, as shown in FIG. 4, one end of the arm 82 is connected to the middle portion of the first rotary shaft 81a integrally with welding and the like and the other end of the arm 82 is connected to the second rotary shaft 81b by welding and the like as shown in FIG. 5. This second rotary shaft 81b rotatably engages with a bearing 85 provided on the upper surface of the change-over valve 8 and is connected with the change-over valve 8.

An inner diameter of the bearing 85 is made larger than an outer diameter of the second rotary shaft 81b so that a gap C is created between the second rotary shaft 81b. The inner diameter of the bearing 85 is larger than the outer diameter of the second rotary shaft 81b by about 10% in this example.

When the exhaust gas passage change-over valve 8 is operated to come to the position shown by the solid line in FIG. 1 and opens the main exhaust passage 34, it closes a passage opening 84 provided on the partitioning plate 83 and when it is operated and comes to the position shown by the broken line and closes a passage opening 87 of a plate 86 provided at the outlet side of the main exhaust passage 34, it opens the passage opening 84 of the partitioning plate 83. Then, when the change-over valve 8 is placed at the position shown by the solid line, opening the main exhaust passage 34 and closing the passage opening 84 at the outlet of the bypass passage 5d, the valve control mechanism part described above is positioned to the side of the bypass passage 5d. Note that each member of the valve control mechanism is also made from a heat resistant metal (stainless steel).

The one-way valve 7a of the reed valve 7 described above operates with a differential pressure of exhaust pulsation on the upstream side of the catalyzer 4 and the downstream side of the adsorber 5 and permits exhaust gas to flow only from the reflux passage 6a to the reflux passage 6b. The switching valve 7b is operated by the diaphragm which is operated by the negative pressure and communicates with the intake pipe 10b which connects the electromagnetic valve 11 with the intake manifold 2 via intake pipes 12a and 12b for supplying the negative pressure to the switching valve 7b. An electromagnetic valve 13 is interposed between the intake pipes 12a and 12b.

A control unit (control means) 14 containing a microcomputer controls opening/closing of the electromagnetic valve 11 and the electromagnetic valve 13 in response to operation states of the engine 1 by receiving signals from the engine 1 and an exhaust gas temperature sensor 15 to control the change-over valve 8 and the switching valve 7b.

Figure 6:
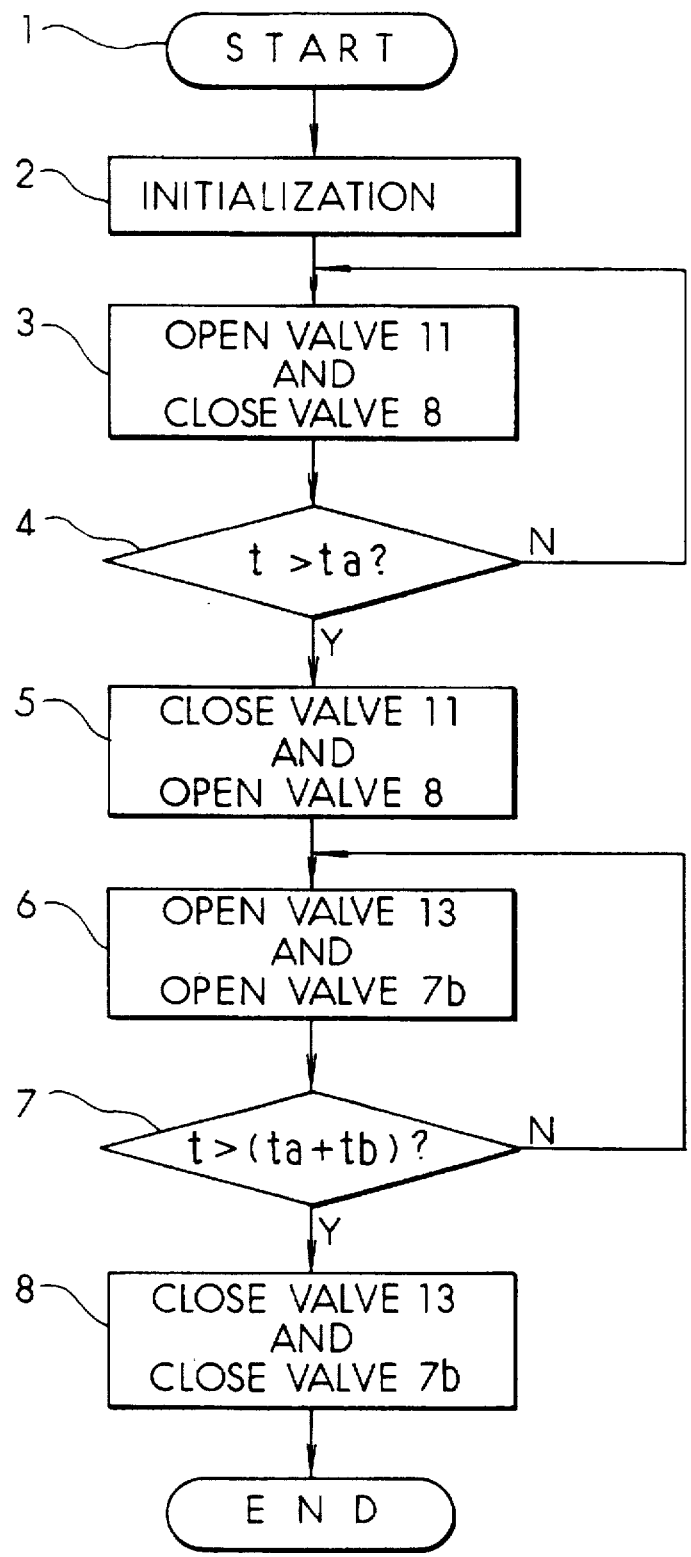
FIG. 6 is a flowchart showing operations of the unit of the first embodiment.

Next, operations of the unit of the first embodiment constructed as described above will be explained. FIG. 6 is a flowchart for explaining the operations. When an ignition switch of the engine 1 is turned on and the engine 1 starts, the microcomputer in the controller 14 starts to activate (Step 1). After the initialization (Step 2), the electromagnetic valve 11 is opened by the controller 14 and the intake pipes 10b and 10b communicate in Step 3.

Then, because a negative pressure of the intake manifold 2 acts on the diaphragm 9a of the actuator 9 via the intake pipes 10a and 10b and pulls the shaft 91 upward, the crank 93 and the first rotary shaft 81a turn clockwise in one body. Then, due to this turn, the change-over valve 8 turns clockwise through the intermediary of the arm 82 and the second rotary shaft 81b and comes to the position shown by the broken line, closing the main exhaust passage 34 and opening the bypass passage 5d.

A temperature of exhaust gas is low right after the start of the engine 1 and the engine 1 emits the exhaust gas containing a large amount of cold HC. Because the catalyst has not reached to the activating temperature while the exhaust gas temperature is low, the cold HC flows through the exhaust pipe 3 without being purified by the catalyzer 4 almost at all. At this time, the exhaust gas temperature is being detected by the exhaust gas temperature sensor 15.

This exhaust gas flow flows through the bypass passage 5d, not the main exhaust passage 34 because it is closed by the change-over valve 8. At this time, it flows first through a layer 5c not carrying absorbent, i.e. zeolite, and then through the adsorbent-carrying layer 5a carrying zeolite, where cold HC is adsorbed by the adsorbent. Then, the exhaust gas from which the cold HC has been removed flows through the passage opening 84 of the partitioning plate 83 and is emitted to the atmosphere via a muffler not shown. At this time, because the rectifying plate 35 rectifies the flow of the exhaust gas, the exhaust gas flows within the adsorber 5 while having a homogeneous flow rate distribution.

When the engine 1 is warmed up and a predetermined time (ta) by which the exhaust gas temperature exceeds the HC adsorbable temperature elapses (t>ta), it is determined to be YES in Step 4 in FIG. 6 and the electromagnetic valve 11 is closed by a signal from the controller 14 in Step 5. Due to that, the supply of the negative pressure to the actuator 9 is shut off and the actuator 9 presses the shaft 91 downward by an elasticity of the spring 9b contained in the actuator 9.

When the shaft 91 moves downward, the crank 93 and the first rotary shaft 81a turn counterclockwise and due to that turn, the change-over valve 8 turns counterclockwise via the arm 82 and the second rotary shaft 81b, thereby coming to the position shown by the solid line in FIG. 1. Due to that, the passage of the exhaust gas is switched and the exhaust gas flows through the main exhaust passage 34 where the adsorber 5 is not present. Because the catalyst has reached to the activating temperature by this time, HC within the exhaust gas is purified by the catalyzer 4 and the exhaust gas containing almost no HC is emitted to the atmosphere via the main exhaust passage 34 described above.

When the electromagnetic valve 11 is closed, the electromagnetic valve 13 is immediately opened by a signal from the controller 14, so that the intake pipe 10b communicates with the intake pipe 12a and a negative pressure is supplied from the intake manifold 2 of the engine 1 to the switching valve 7b, thereby opening the switching valve 7b.

Meanwhile, the exhaust gas whose temperature has become high is flowing through the main exhaust passage 34 at the side of the adsorber 5. This high temperature exhaust gas contacts with the adsorbent-carrying layer 5a of the adsorber 5 through the intermediary of the opening 33a of the partition 33. Due to that, a heat of the exhaust gas is transmitted to the adsorbent-carrying layer 5a favorably and a temperature of the adsorbent is quickly increased, thereby accelerating the desorption of HC.

At this time, because the switching valve 7b is opened as described above, an exhaust gas pulsating pressure generated within the exhaust manifold 31 is applied to the back of the one-way valve 7a via the reflux passage 6b. Further, an exhaust gas pulsating pressure generated on the downstream side of the adsorber 5 is applied to the surface of the one-way valve 7a via the reflux passage 6a, thereby opening the one-way valve 7a intermittently.

Thereby, HC desorbed from the adsorbent of the adsorbent-carrying layer 5a of the adsorber 5 quickly flows into the exhaust manifold 31 via the reflux passages 6a and 6b. It is then purified by the catalyzer 4 together with HC within exhaust gas from the engine 1.

When a time (tb) for completing the desorption of HC elapses after entering the HC desorption and purification process as the change-over valve 8 is switched to the open position (shown by the solid line) [t>(ta+tb)], it is determined to be YES in Step 7 and the electromagnetic valve 13 is closed from a signal from the controller 14, thereby closing the switching valve 7b.

Note that although the electromagnetic valve 11 has been opened by the signal from the controller 14 to switch the change-over valve 8 to the side of the process for desorbing and purifying HC (the solid line position) after the elapse of the predetermined time from the start of the engine in the first embodiment described above, that timing may be a point of time when the exhaust gas temperature reaches at a certain high temperature, instead of determining the elapse of the predetermined period of time.

Further, the reed valve 7 comprises the one-way valve 7a and the switching valve 7b in the first embodiment, it may be structured only by the one-way valve 7a.

In the exhaust gas purification system of the first embodiment, the adsorber 5 adsorbs cold HC even while the engine is cool until when the catalyst reaches to its activating temperature to prevent the cold HC from being emitted to the atmosphere. In particular, this system can circulate and purify the desorbed HC effectively by opening the one-way valve 7a intermittently by the pulsating pressures of exhaust gas applied to the surface and back of the one-way valve 7a and by returning desorbed HC to the upstream side of the catalyzer 4 via the reflux passages 6a and 6b. Further, because the desorbed HC is circulated to the exhaust pipe 31 on the upstream side of the catalyzer 4, an adverse effect on the control of the engine due to the circulation of HC may be reduced.

Next, a measure taken for the exhaust gas passage change-over valve 8 to counter an intense heat, which is a feature of the present invention, will be explained. That is, because the actuator 9 is separated from the adsorption cylinder 50 by a certain distance by the pedestal 92, it will receive no heat directly from the adsorption cylinder 50. Further, even if heat is transmitted via the shaft 91 and the pedestal 92, the actuator 9 is cooled by the ambient atmosphere and may be kept in a relatively low temperature state because it is isolated by the pedestal 92. Accordingly, almost no failure or deterioration of the actuator 9 is caused by the intense heat of the exhaust gas.

Further, in order to prevent exhaust gas from leaking from the adsorption cylinder 50 to the atmosphere, a clearance of the engage section of the bearing 83a of the partitioning plate 83 and the first rotary shaft 81a shown in FIG. 4 must be kept small as much as possible.

However, because the bearing 83a of the partitioning plate 83 and the first rotary shaft 81a are exposed to high temperature exhaust gas, a pinch or lock of the first rotary shaft 81a is apt to be caused due to a thermal deformation if the clearance of the engaging section is too tight.

Then, in the first embodiment, because the first rotary shaft 81a is formed by the shaft having different diameters and only the both end portions thereof are axially supported by the bearing 83a as shown in FIG. 4, the leakage of exhaust gas is prevented by a micro-clearance control at the both end portions (the maximum diameter portions) and at the same time, the pinch and lock of the first rotary shaft 81a due to the thermal deformation is prevented from occurring by relieving the thermal deformation at the middle portion (small diameter portion).

Because a length of the portions (both end portions of the first rotary shaft 81a) which require the micro-clearance control is reduced according to the structure described above, the shaft processing time and hence the processing cost may be reduced.

Further, because the change-over valve 8 acts on the passage opening 87 of the main exhaust passage 34 and the passage opening 84 of the bypass passage 5d at right angle as shown in FIG. 3, it can shut off and switch the passages effectively even if its effective area is small.

Still more, because the control mechanism part of the change-over valve 8 is positioned within the bypass passage 5d on the side of the adsorber 5 when the change-over valve 8 is opened (the solid line position), the control mechanism part of the change-over valve 8, in particular the rotary shafts 81a and 81b, is not exposed to the high temperature exhaust gas flowing through the main exhaust passage 34. Due to that, troubles of the rotary shaft part which might be otherwise caused by the intense heat such as inoperability and deterioration thereof may be effectively prevented from occurring. Furthermore, because the change-over valve 8 is kept parallel with the flow of exhaust gas in the main exhaust passage 34, it barely becomes a resistance to the flow of exhaust gas in the main exhaust passage 34.

Further, because the inner diameter of the bearing 85 is made larger than the outer diameter of the second rotary shaft 81b so that the gap C is created between the second rotary shaft 81b in connecting the second rotary shaft 81b to the change-over valve 8 by rotatably engaging it to the bearing 85 at the upper surface of the change-over valve 8, the passage opening 84 can be reliably closed even if the partitioning plate 83 inclines for example because the gap C between the bearing 85 and the second rotary shaft 81b described above can absorb such inclination.

[Second Embodiment]

Figure 7:
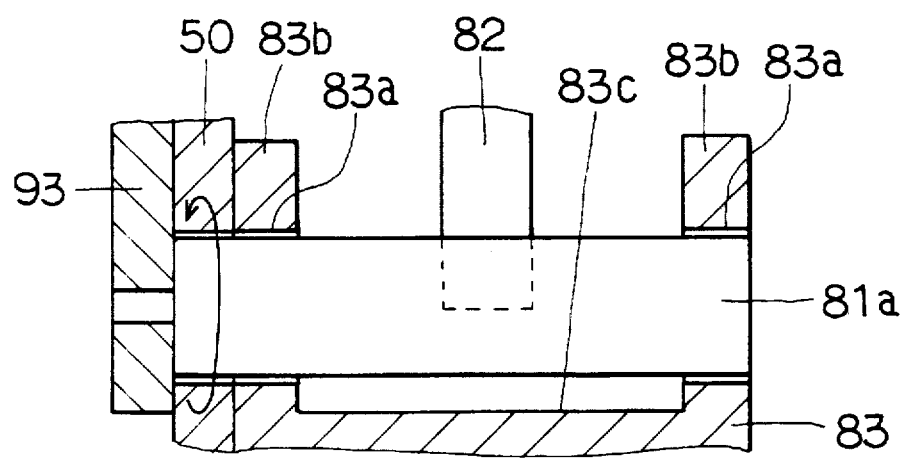
FIG. 7 is an enlarged section view of a main part showing a second embodiment of the present invention and corresponding to the view viewed from A in FIG. 3.

FIG. 7 shows a second embodiment of the present invention, wherein the position of the bearings 83a on the partitioning plate 83 is set at an upward position from an upper surface 83c of the partitioning plate 83 by a certain distance to be able to axially support the first rotary shaft 81a by the bearings 83a only at the both end portion thereof even if the first rotary shaft 81a has a same diameter across the whole length thereof.

This arrangement shown in FIG. 7 also allows to prevent the leakage of exhaust gas by the micro-clearance control at the both end portions (maximum diameter portions) and the pinch and lock of the first rotary shaft 81a which might be otherwise caused by a thermal deformation from occurring by relieving the thermal deformation at the middle portion (small diameter portion) similarly to the case shown in FIG. 4.

[Third Embodiment]

Figure 8:
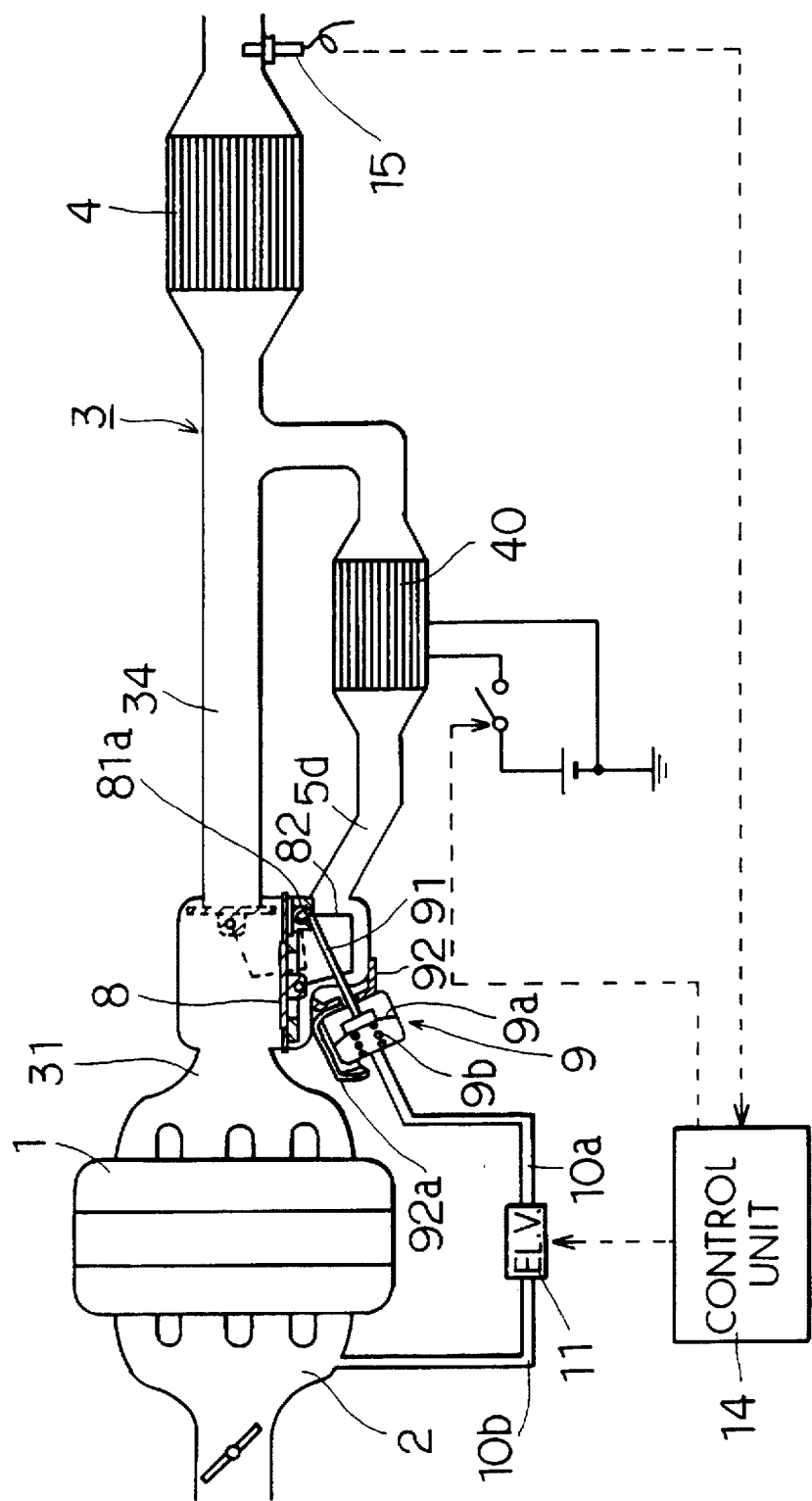
FIG. 8 is an overall structural diagram of a unit according to a third embodiment of the present invention.
Figure 10:
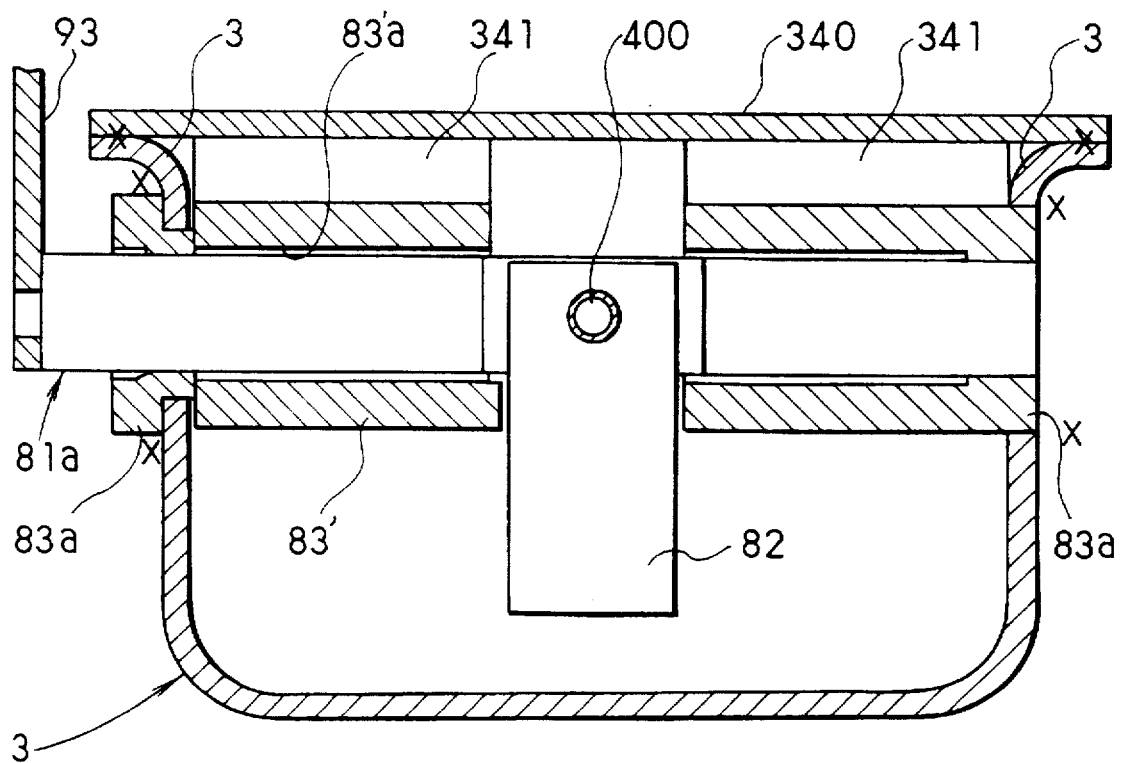
FIG. 10 is a section view taken along a line X—X in FIG. 9.

FIGS. 8 and 10 show a third embodiment of the present invention, wherein a catalyzer 40 fitted with an electrical heater is used as a quick activating catalyzer, instead of using the adsorber 5 in the first and second embodiments. The present embodiment will be explained below more concretely. The exhaust gas passage change-over valve 8 is provided at the exhaust manifold 31 of the automobile engine 1. The change-over valve 8 is provided with two outlet passages, the bypass passage 5d and the main exhaust passage 34, as against one inlet passage.

The change-over valve 8 selects the bypass passage 5d or the main exhaust passage 34 as an outlet passage in response to a time when the engine 1 is cool or warm. The actuator 9 for driving the change-over valve 8 is attached to an outer wall of the exhaust pipe 3 on the side of the bypass passage 5d through an intermediary of the pedestal 92. This pedestal has a forked shape and is attached to an outer wall of a case of the actuator 9 and to the outer wall of the exhaust pipe 3 of the bypass passage 5d by means of welding or the like.

Because the actuator 9 is isolated from the bypass passage 5d by a predetermined distance (about 35 mm) by this pedestal 92, it hardly receives heat from the bypass passage 5d. The pedestal 92a is formed integrally with a heat shielding plate 92a which covers the upper part of the actuator 9 to protect the actuator 9 from radiant heat from the engine 1 and the exhaust pipe 3. In the present embodiment, the heat shielding plate 92a is designed so as to cover the part of the actuator 9 facing the engine 1 and the exhaust pipe 3 (about ⅓ of whole area).

The operation of the actuator 9 is controlled by opening/ closing the electromagnetic valve 11 provided between the intake pipes 10a and 10b similarly to the first embodiment.

The heater-fitted catalyzer (EHC) 40 is provided in the bypass passage 5d. This heater-fitted catalyzer 40 known in the prior art is adapted to quickly activate catalyst by causing a carrier formed of ceramics or a heat resistant metal such as stainless steel to carry catalyst such as platinum or rhodium and by containing an electrical heater to heat the catalyst by feeding power to the heater.

The bypass passage 5d joins again with the main exhaust passage 34 on the downstream side thereof and the catalyzer 4 which plays a role of a main catalyzer is disposed in the re-unified exhaust pipe 3. Note that the exhaust gas temperature sensor 15 is disposed on the downstream side of the catalyzer 4 to detect exhaust gas temperature at the section of the catalyzer 4 to monitor the active state of the catalyzer 4. The signal of the exhaust gas temperature sensor 15 is taken into the controller 14, which determines ON/OFF of the electromagnetic valve 11 and the heater-fitted catalyzer 40.

It is of course possible to input operation conditions of the engine 1 (e.g. engine speed, intake air flow amount, negative pressure of intake pipe, engine water temperature, concentration of oxygen in exhaust gas and air-fuel ratio, etc.) to control ON/OFF of the electromagnetic valve 11 and the heater-fitted catalyzer 40 by such conditions.

Figure 9:
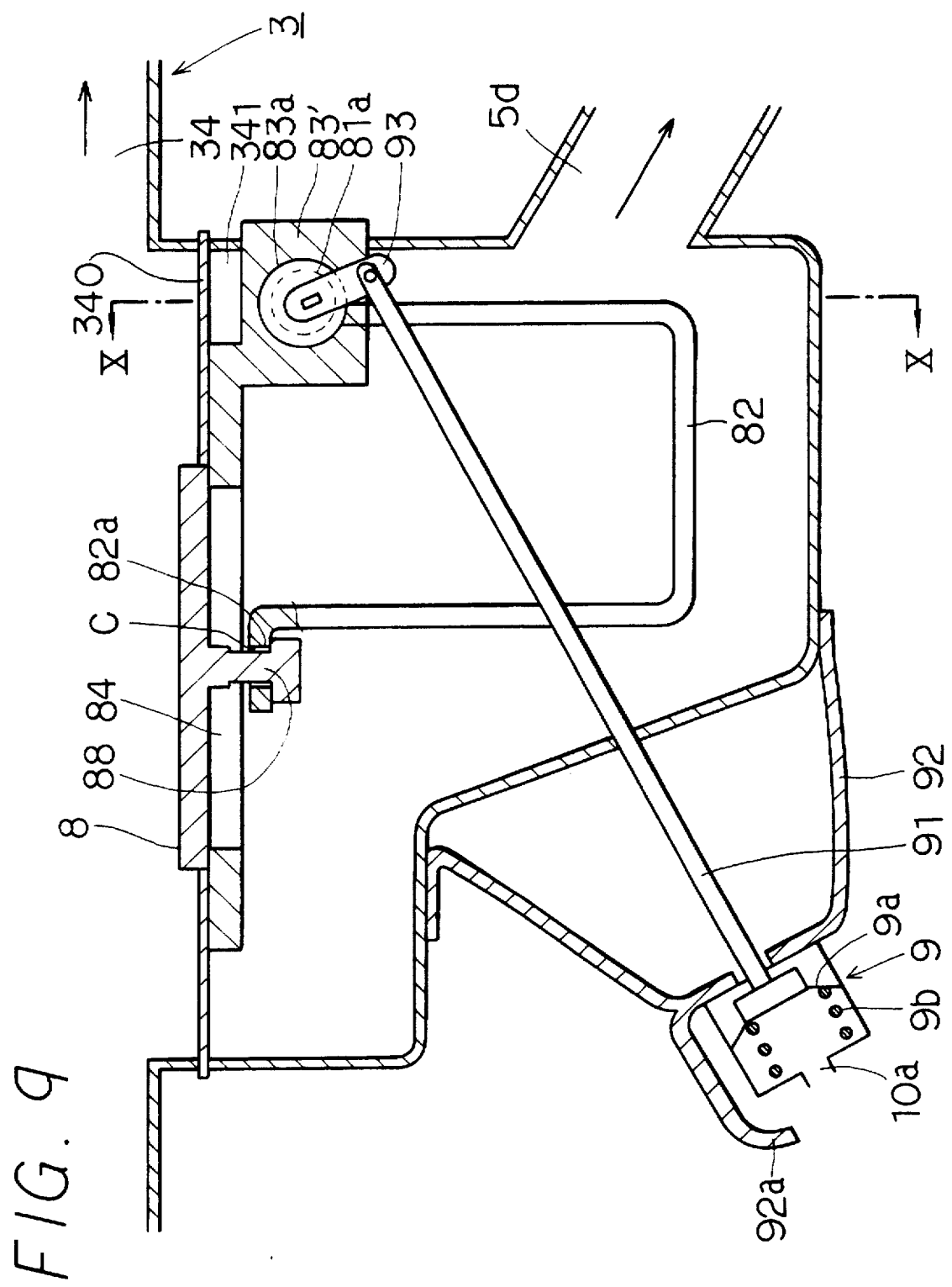
FIG. 9 is an ellarged section view of an exhaust gas passage change-over valve in the unit of the third embodiment.

Next, a concrete structure of the exhaust gas passage change-over valve 8 part will be explained in detail based on FIGS. 9 and 10. FIG. 9 is a section view of the change-over valve 8 part, showing a state in which the bypass passage 5d is completely closed and the main exhaust passage 34 is opened. By this state, the engine 1 has been warmed up and an exhaust gas temperature has become high. The high temperature exhaust gas flows through the main exhaust passage 34 located at the upper part in FIG. 9 and does not flow through the bypass passage 5d. A shaft 91 and crank 93 of the actuator 9 are disposed outside of the exhaust pipe 3. One end of the rotary shaft 81a protrudes out of the exhaust pipe 3 and the crank 93 is connected to the protruding end of the rotary shaft 81a so as to turn in one body. The rotary shaft 81a is axially and rotatably supported by bearings 83a provided on a partitioning plate 83' and is stored within the region of the bypass passage 5d side in the exhaust pipe 3.

The pivot structure of the rotary shaft 81a and the bearings 83a may be same with the structure (in which only the both ends of the shaft are supported) in the first embodiment shown in FIG. 4 or in the second embodiment shown in FIG. 7. In the present embodiment, however, a part of the partitioning plate 83' forming the bearing 83a (right end in FIG. 9) is exposed to the outside penetrating through the wall of the exhaust pipe 3 so as to be able to cool the part of the partitioning plate 83' having the bearing 83a directly by the outside air.

One end of the arm 82 is connected by welding or the like to the middle portion of the rotary shaft 81a which is not supported by the bearing 83a. The other end of the arm 82 is connected to the change-over valve 8 in the manner described below. That is, a connecting shaft 88 is formed at the center part of the disc-like change-over valve 8 integrally therewith. The other end of the arm 82 is connected to this shaft 88 by caulking the distal end of the shaft 88 after inserting the shaft 88 through a hole 82a provided at the other end of the arm 82.

Here, an inner diameter of the hole 82a of the other end of the arm 82 is made larger than an outer diameter of the shaft 88 of the change-over valve 8 by about 10% to provide a gap C (which plays the same role with the gap C in FIG. 5) between the shaft 88 of the change-over valve 8 and the hole 82a. Further, a passage opening 84 is created penetrating through a center plate 340 and the partitioning plate 83' partitioning the main exhaust passage 34 and the bypass passage 5d within the exhaust pipe 3.

Still more, a space 341 is created between the center plate 340 and the partitioning plate 83' by creating a missing part at a part of the partitioning plate 83' to suppress heat from being transmitted from the center plate 340 to the bearing 83a. A thermal deterioration caused by the exhaust gas heat transmitted from the center plate 340 to the bearing 83a may be suppressed by creating such space 341.

FIG. 10 is a section view taken along a line X—X in FIG. 9. The partitioning plate 83' having a rectangular shape in cross section and through hole 83'a along a longitudinal direction thereof is fixed to the flat-plate like center plate 340 by welding. A first end side (right side in FIG. 10) of the partitioning plate 83' is welded at X-marked points (right side) in FIG. 10 with respect to the side of the exhaust pipe 3. The rotary shaft 81a of which first end (right side in the figure) is rotatably supported by the bearing 83a formed on the partitioning plate 83' is inserted into the through hole 83'a. A second end of the rotary shaft 81a protrudes outside from the through hole 83'a through exhaust pipe 3. This protruded portion is rotatably supported by the bearing 83a. The bearing 83a (left side in the figure) is disposed to contact to the end of the partitioning plate 83'. The bearing 83a has a smaller diameter portion to receive an edge of a through hole formed on the exhaust pipe 3. The bearing 83a is welded to the exhaust pipe 3 at X-marked points (left side) in the figure. A lever 93 is rotatably connected to he second end of the rotary shaft 81a. The arm 82 is connected to an intermediate portion of the rotary shaft 81a through fastening unit such as a bolt and nut, thereby the rotation of the rotary shaft 81a is transmitted to change-over valve 8 through the arm 82. Between the center plate 340 and the missing part on the upper surface of the partitioning plate 83', space 341 is formed, thereby the heat from exhaust gas to receive the center plate 340 is prevented from transmitting to the partitioning plate 83' and further the heat is not transmitted to the rotary shaft 81a through the partitioning plate 83'. Therefore, the rotary shaft 81a does not seized at the bearing 83a and operation inferiority is avoided.

Note that the parts of the valve control mechanism of the change-over valve 8 described above are all made from a heat resistant metal such as stainless steel, similarly to the first embodiment.

Next, operations of the third embodiment will be explained with reference to FIG. 8. When the engine has been just started and is cool, the electromagnetic valve 11 and the heater-fitted catalyzer 40 are turned on by the controller 14. Thereby, the intake pipes 10a and 10b communicate, a negative pressure of the intake manifold 2 acts on the actuator 9 via the intake pipes 10a and 10b, turning the rotary shaft 81a of the change-over valve 8, the change-over valve 8 comes to a position shown by the broke line (the main exhaust passage 34 is closed) and the passage opening 84 which is an inlet to the bypass passage 5d is opened.

Although the change-over valve 8, arm 82 and others are exposed to exhaust gas flowing into the bypass passage 5d at this time, a temperature of the exhaust gas is low because the engine has been just started and is cool and it exerts no thermal deterioration on each component of the change-over valve 8. At this time, a current also flows through the heater of the heater-fitted catalyzer 40. A temperature of the heater-fitted catalyzer 40 rapidly increases by the heat of the heater and reaches to the activating temperature in a short time. When the engine has been just started, the exhaust gas is emitted from the change-over valve 8 via the heater-fitted catalyzer 40 within the bypass passage 5d by the operations described above. At this time, hazardous components within the exhaust gas are purified by the heater-fitted catalyzer 40 which has been already in the active state.

The exhaust gas warmed up by the heat of the heater and by the catalytic reaction passes through the bypass passage 5d and warms up the catalyzer 4 located at the downstream side thereof. While this state continues until the catalyzer 4 is activated, the exhaust gas temperature sensor 15 located at the downstream side of the catalyzer 4 determines whether it has been activated or not.

When the engine 1 is warmed up and the catalyzer 4 reaches to the activating temperature, the power fed to the electromagnetic valve 11 and the heater-fitted catalyzer (EHC) 40 is turned off by a signal from the controller 14. Thereby, the negative pressure supplied to the actuator 9 is shut off and the actuator 9 turns the rotary shaft 81a of the change-over valve 8 in the reverse direction by an elasticity of the spring 9b contained therein. Due to that, the change-over valve 8 comes to the position shown by the solid line (the main exhaust passage 34 is opened) and the passage opening 84 which is the inlet to the bypass passage 5d is closed.

At this time, because each component of the valve control mechanism of the change-over valve 8 is stored on the side of the bypass passage 5d, they are not exposed directly to the high temperature exhaust gas. Furthermore, because the partitioning plate 83' on which the bearing 83a supporting the rotary shaft 81a is provided is exposed to the outside penetrating through the wall of the exhaust pipe 3, it is exposed to the outside air and a cooling effect is brought about by radiating heat to the outside air. The heat from the high temperature exhaust gas may be also suppressed from being transmitted by isolating the part of the bearing 83a from the center plate 340 by the space 341. In total, a thermal deterioration of the valve control mechanism of the change-over valve 8 which might be otherwise caused may be effectively suppressed and the reliability against the intense heat may be remarkably improved.

The exhaust gas is then emitted via the change-over valve 8, the main exhaust passage 34 and the catalyzer 4. At this time, the hazardous components in the exhaust gas are purified by the catalyzer 4 whose temperature has become high and which has been activated.

Thus, the change-over valve 8 flows exhaust gas to the heater-fitted catalyzer 40, a quick activating catalyst, when the engine is cool to quickly warm up the main catalyzer 4 and flows exhaust gas only to the main catalyzer 4 when the engine is warm to protect the heater-fitted catalyzer 40 (quick activating catalyzer) provided near the engine from heat. Due to that, because a high exhaust gas purifying efficiency may be obtained in any operating conditions of the engine 1 and the catalyst may be suppressed from deteriorating, the high exhaust gas purifying efficiency may be maintained for a long period of time.

Note that although the heater-fitted catalyzer 40 has been used as the quick activating catalyst in the third embodiment, a catalyst which is adapted to be quickly activated by forming the carrier carrying the catalyst by a metal (concretely made from stainless steel) to reduce a thermal capacity of the catalyst carrier considerably as compared to that made from ceramics. In this case, no heater needs to be fitted to the heater-fitted catalyzer 40.

Further, it is also possible to dispose the main catalyzer 4 on the upstream side of the change-over valve 8 or to dispose the change-over valve 8 on the downstream side of the bypass passage 5d and the main exhaust passage 34 in the third embodiment.

[Fourth Embodiment]

Figure 11:
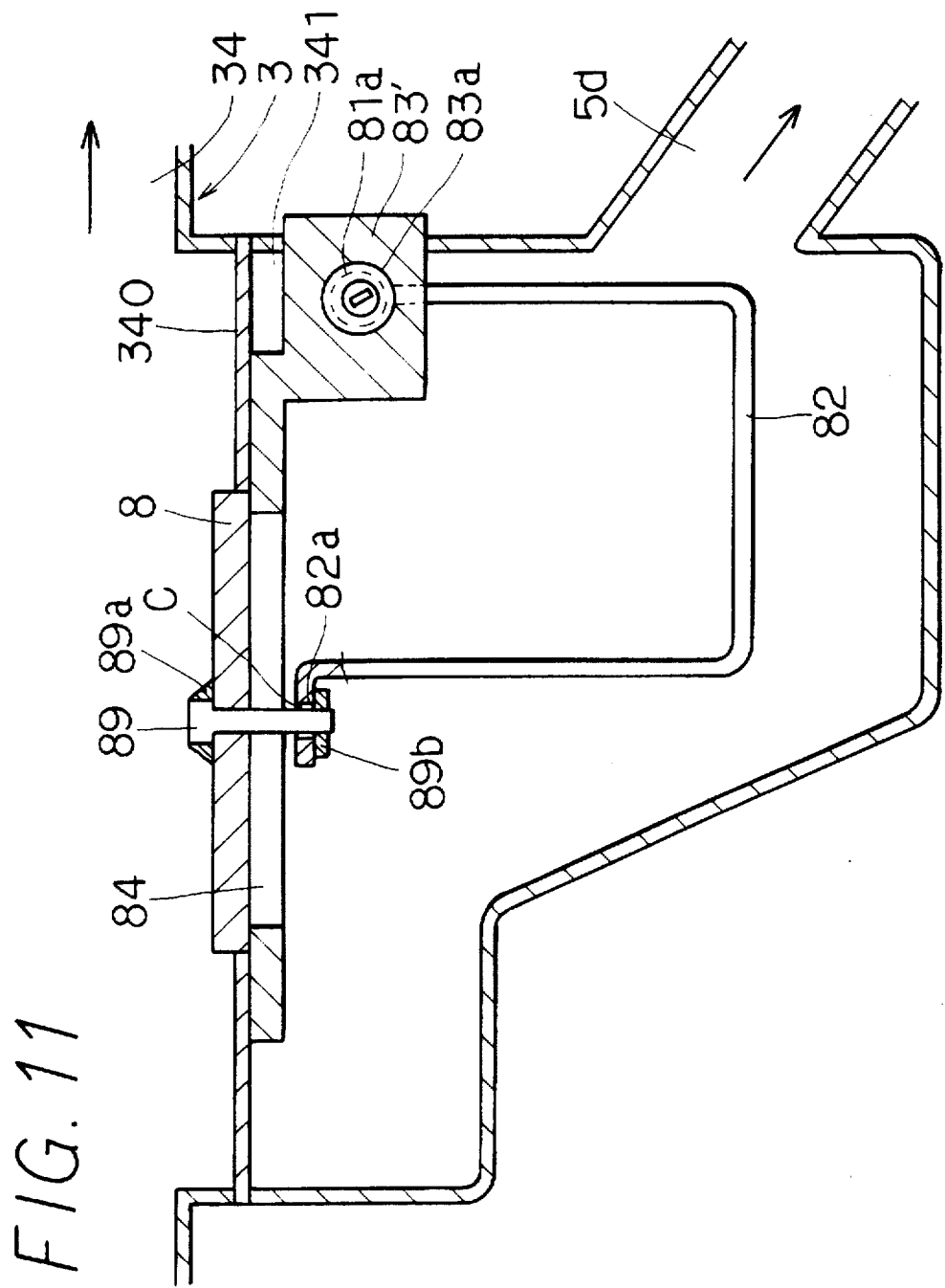
FIG. 11 is an enlarged section view of an exhaust gas passage change-over valve in a unit of a fourth embodiment of the present invention.

FIG. 11 shows a fourth embodiment of the present invention. In the present embodiment, a shaft (pin) 89 formed separately from the change-over valve 8 is used. This shaft 89 is fixed to the change-over valve 8 by a welded portion 89a and is connected with the other end of the arm 82 by welding a stopper 89b to the distal end of the shaft 89 after inserting the shaft 89 through a hole 82a created on the other end of the arm 82.

According to the fourth embodiment, the change-over valve 8 may be a simple disc having a center hole for engaging the shaft 89, so that the valve plate portion of the change-over valve 8 may be readily manufactured as compared to the change-over valve 8 which is formed integrally with the shaft 88 as described in the third embodiment. Further, because the process of caulking the distal end of the shaft 88 in the third embodiment is not necessary, it may be assembled readily.

Note that although the actuator 9 is not shown in FIG. 11, the shaft 91 of the actuator 9 is connected to the rotary shaft 81a through the intermediary of the crank 93 in the same manner with the structure shown in FIG. 9.

[Fifth Embodiment]

Figure 12:
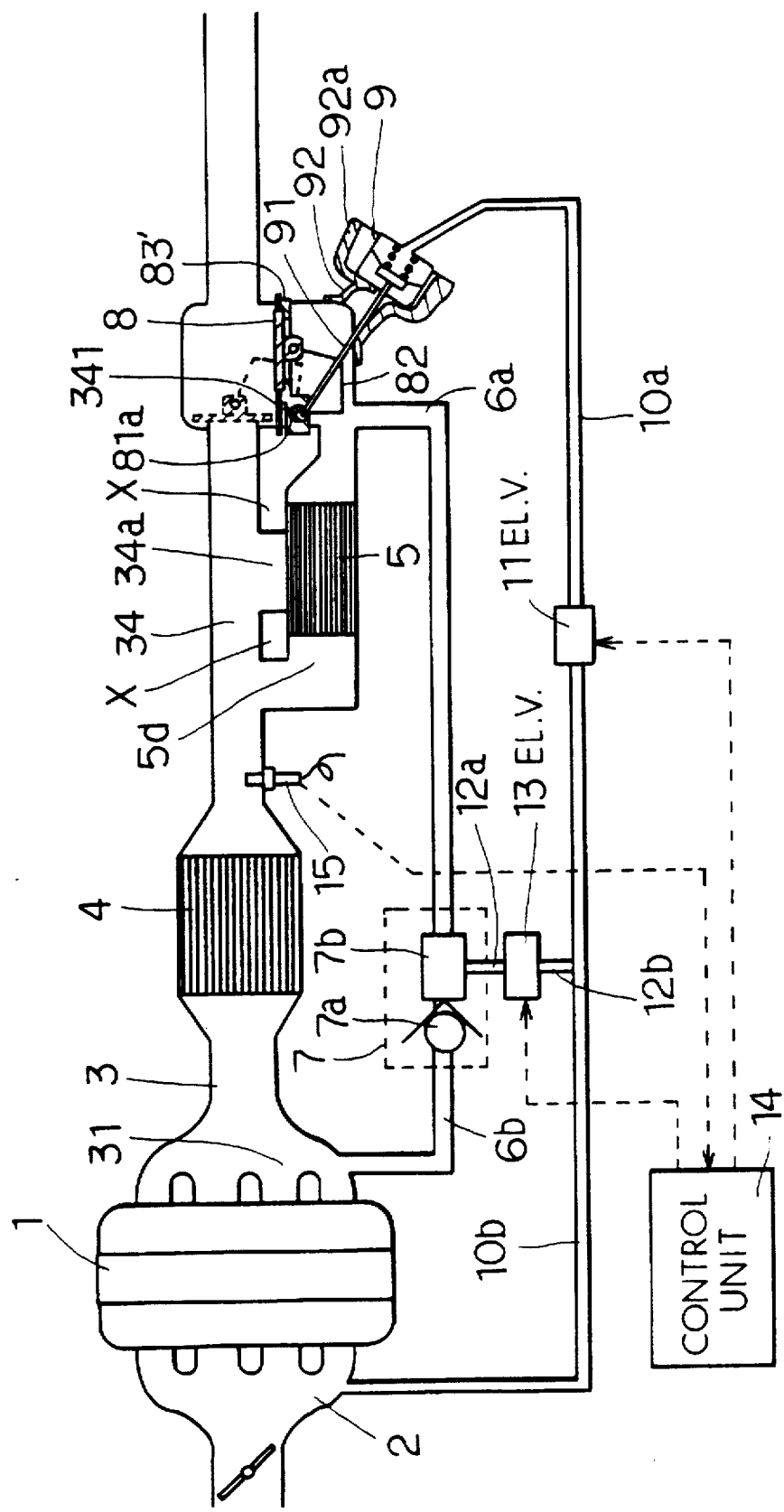
FIG. 12 is an overall structural diagram of a unit according to a fifth embodiment of the present invention.

FIG. 12 shows a fifth embodiment which is a modification of the first embodiment. That is, while the inside of the cylindrical adsorption cylinder 50 is partitioned by the partition 33 to form the bypass passage 5d on the adsorber 5 side and the main exhaust passage 34 in parallel in the first embodiment, the bypass passage 5d on the adsorber 5 side and the main exhaust passage 34 are constructed by respective independent exhaust pipes in the exhaust pipe 3 on the downstream side of the catalyzer 4.

Accordingly, spaces X opened to the atmosphere exist between the bypass passage 5d and the main exhaust passage 34 and a passage protruding portion 34a for transmitting heat of exhaust gas flowing through the main exhaust passage 34 to the adsorber 5 to accelerate the desorption of HC adsorbed by the adsorber 5 is formed between the spaces X.

Further, because the bypass passage 5d and the main exhaust passage 34 are constructed by independent exhaust pipes as described above in the fifth embodiment, it becomes possible to dispose the valve control mechanism part of the change-over valve 8 on the bypass passage side and at the same time to expose the whole peripheral side of the valve control mechanism part of the change-over valve 8 to the atmosphere. Such layout allows to emit the heat of the valve control mechanism part of the change-over valve 8 to the atmosphere more favorably.

Since its overall operation as the exhaust gas purifier is the same with the first embodiment, its explanation is omitted here.

It is to be understood that the present invention is not limited to the above-mentioned embodiments illustrated in the accompanying drawings and is capable of being practiced in various ways. For example, the present invention is applicable to a type of unit in which the reflux passages 6a and 6b are not connected to the exhaust passage right upstream the catalyzer 4 but to the intake manifold 2 of the engine 1.

What is claimed is:

1. A changeover valve unit for an engine, for switching a bypass passage through which exhaust gas flows when said engine is cool and a main exhaust passage through which exhaust gas flows when said engine is warm, comprising:

a changeover valve for switching said bypass passage and said main exhaust passage;

an actuator for driving said changeover valve; and a valve control mechanism disposed between said changeover valve and said actuator, for transmitting an action of said actuator to said changeover valve, wherein, said valve control mechanism includes:

a transmission member having a first end to which said actuator is connected and a second end;

a bearing unit which is operatively connected to said changeover valve and said second end of said transmission member, for transmitting an action of said transmission member to said changeover valve, said bearing unit having a rotary shaft and a bearing for supporting said rotary shaft to form a clearance therebetween; and wherein said changeover valve is moved in a range of said clearance to switch said main exhaust passage and said bypass passage.

2. A changeover valve unit according to claim 1, wherein said valve control mechanism is disposed within said bypass passage to be separated from said main exhaust passage when said changeover valve is switched to open said main exhaust passage.

3. A changeover valve unit according to claim 1, wherein said bypass passage is formed in an exhaust pipe for said engine.

4. A changeover valve unit according to claim 3, further comprising:

a pedestal for mounting said actuator on said exhaust pipe in such a manner that said actuator is separated from said exhaust pipe.

5. A changeover valve unit according to claim 4, further comprising:

a heat shielding plate positioned between said actuator and said exhaust pipe, for shielding heat transmitted from said exhaust pipe to said actuator, wherein said pedestal is formed integrally with said heat shielding plate.

6. A changeover valve unit according to claim 1, wherein said actuator includes a shaft having a first end to which the rest of said actuator is operatively connected, said shaft having a second end to which said rotary shaft of said bearing unit is operatively connected through said transmission member so that an action of said actuator is transmitted to said rotary shaft through said shaft of said actuator and said transmission member.

7. A changeover valve unit according to claim 1, further comprising:

a member for forming said bearing, which is fixed to an exhaust pipe and is disposed at the side of said bypass passage, wherein a part of said member is exposed to outside air through said exhaust pipe.

8. A changeover valve unit according to claim 1, further comprising:

a partition for dividing said bypass passage and said main exhaust passage, wherein said bearing is disposed to be separated from said partition.

9. A changeover valve unit according to claim 1, wherein said rotary shaft has a first end, a second end and a middle portion, and is supported by said bearings only at said first and second ends of said rotary shaft.

10. A changeover valve unit according to claim 9, wherein each of said first and second ends of said rotary shaft has a diameter different from that of said middle portion.

11. A changeover valve unit according to claim 2, wherein, said bearing has an inner diameter, and wherein said inner diameter of said bearing is larger than an outer diameter of said rotary shaft to form said clearance.

12. A changeover valve unit for an engine, for switching a bypass passage through which exhaust gas flows when said engine is cool and a main exhaust passage through which exhaust gas flows when said engine is warm, comprising:

a changeover valve for switching said bypass passage and said main exhaust passage;

an actuator for driving said changeover valve; and a valve control mechanism disposed between said changeover valve and said actuator, for transmitting an action of said actuator to said changeover valve, wherein, said valve control mechanism includes:
   a transmission member having a first end to which said actuator is connected and a second end; and
   a bearing unit which operatively connects said changeover valve and said second end of said transmission member, said bearing unit transmitting an action of said transmission member to said changeover valve,
wherein said bearing unit has a first rotary shaft for rotating said changeover valve, a second rotary shaft connected to said first rotary shaft through said transmission member, and a bearing for supporting said second rotary shaft to form a clearance therebetween, and
said changeover valve is rotated in a range of said clearance to switch said main exhaust passage and said bypass passage.

13. An exhaust gas purifying system for an engine, comprising:
   an exhaust pipe including a bypass passage and a main exhaust passage formed in parallel with said bypass passage;
   a catalyzer disposed within said exhaust pipe at an upstream side of said bypass passage and said main exhaust passage;
   an adsorber disposed within said bypass passage, for adsorbing hazardous components in exhaust gas;
   a reflux pipe forming a reflux passage for returning the components in the exhaust gas, adsorbed by said adsorber to an upstream side of said catalyzer;
   exhaust gas passage switching means for selectively switching exhaust gas flowing through said bypass passage and said main exhaust passage;
   an actuator for driving said switching means; and
   control means for generating control signals for controlling said actuator to switch said switching means to open said bypass passage when said engine is cool and to open said main exhaust passage when said engine is warm, wherein,
   said switching means includes:
      a changeover valve rotatably disposed within said exhaust passage and selectively switching said bypass passage and said main exhaust passage; and
      a valve control mechanism disposed between said changeover valve and said actuator to said changeover valve; and wherein
   said valve control mechanism includes:
      a transmission member having a first end to which said actuator is connected and a second end; and
      a bearing unit which operatively connects said changeover valve and said second end of said transmission member, said bearing unit transmitting an action of said transmission member to said changeover valve, and said bearing unit having a rotary shaft and a bearing for supporting said rotary shaft to form a clearance therebetween, and
   said changeover valve is moved in a range of said clearance to sufficiently close and switch said main exhaust passage or said bypass passage.

14. An exhaust gas purifying system according to claim 13, wherein said transmission member and said bearing unit are disposed within said bypass passage to be separated from said main exhaust passage when said changeover valve is switched to open said main exhaust passage.

15. An exhaust gas purifying system according to claim 13, further comprising:
   a pedestal for mounting said actuator on said exhaust pipe in such a manner that said actuator is spatially separated from said exhaust pipe.

16. An exhaust gas purifying system according to claim 13, further comprising:
   a member for forming said bearing, which is fixed to said exhaust pipe and is disposed at the side of said bypass passage,
   wherein a part of said member is exposed to outside air through said exhaust pipe.

17. An exhaust gas purifying system according to claim 13, further comprising:
   a partition for dividing said bypass passage and said main exhaust passage,
   wherein said bearing is disposed to be separated from said partition.

18. An exhaust gas purifying system according to claim 17, wherein a part of said valve control mechanism is exposed to outside air.

19. An exhaust gas purifying system according to claim 13, wherein said rotary shaft has a first end, a second end and a middle portion, and is supported by said bearings only at said first and second ends of said rotary shaft.

20. An exhaust gas purifying system according to claim 19, wherein each of said first and second ends of said rotary shaft has a diameter different from that of said middle portion.

21. An exhaust gas purifying system according to claim 13, wherein,
   said bearing has an inner diameter, and
   said inner diameter of said bearing is larger than an outer diameter of said rotary shaft to form said clearance.

22. An exhaust gas purifying system for an engine, comprising:
   an exhaust pipe forming a bypass passage and a main exhaust passage formed in parallel with said bypass passage;
   a catalyzer disposed within said exhaust pipe at an upstream side of said bypass passage and said main exhaust passage;
   a quick activating catalyzer disposed in said bypass passage, for purifying hazardous components in exhaust gas temperature lower than that of said catalyzer;
   exhaust gas passage switching means for selectively switching exhaust gas flowing through said bypass passage and said main exhaust passage;
   an actuator for driving said switching means; and
   control means for generating control signals for controlling said actuator to switch said switching means to open said bypass passage when said engine is cool and to open said main exhaust passage when said engine is warm, wherein,
   said switching means includes:
      a changeover valve rotatably disposed within said exhaust passage and selectively switching said bypass passage and said main exhaust passage; and
      a valve control mechanism disposed between said changeover valve and said actuator to said changeover valve; and wherein
   said valve control mechanism includes:
      a transmission member having a first end to which said actuator is connected and a second end;
      a bearing unit which operatively connects said changeover valve and said second end of said transmission member, for transmitting an action of said transmission member to said changeover valve, said bearing unit having a rotary shaft and a bearing for supporting said rotary shaft to form a clearance therebetween; and said changeover valve is moved in a range of said clearance to switch said main exhaust passage or said bypass passage.

* * * * *